US008100231B2

(12) United States Patent
Petzl et al.

(10) Patent No.: US 8,100,231 B2

(45) Date of Patent: Jan. 24, 2012

(54) SELF-LOCKING DESCENDER WITH DISENGAGEABLE HANDLE

(75) Inventors: Paul Petzl, Barraux (FR); Alain Maurice, Sain Hilaire du Touvet (FR); Pierre Olivier Chabod, Villard Bonnot (FR)

(73) Assignee: Zedel, Crolles (FR)

( * ) Notice: Subject to any disclaimer, the term of this patent is extended or adjusted under 35 U.S.C. 154(b) by 763 days.

(21) Appl. No.: 12/155,900

(22) Filed: Jun. 11, 2008

(65) Prior Publication Data

US 2009/0026023 A1 Jan. 29, 2009

(30) Foreign Application Priority Data

Jul. 26, 2007 (FR) .................................... 07 05481

(51) Int. Cl.
*B65H 59/14* (2006.01)
*F16D 65/00* (2006.01)

(52) U.S. Cl. .......................... 188/65.5; 182/5; 24/134 R

(58) Field of Classification Search ................. 188/65.1, 188/65.2, 65.3, 65.4, 65.5; 182/5, 6, 7, 8, 182/9, 193; 24/132 WL, 134 R, 134 KB, 24/115 F See application file for complete search history.

(56) References Cited

U.S. PATENT DOCUMENTS

| | | | | | |
|---|---|---|---|---|---|
| 5,054,577 | A | * | 10/1991 | Petzl et al. | 182/5 |
| 5,360,083 | A | * | 11/1994 | Hede | 182/5 |
| 5,577,576 | A | | 11/1996 | Petzl et al. | |
| 5,634,532 | A | * | 6/1997 | Bucher | 188/1.12 |
| 5,850,893 | A | * | 12/1998 | Hede et al. | 182/193 |
| 6,029,777 | A | * | 2/2000 | Rogelja | 182/193 |

FOREIGN PATENT DOCUMENTS

EP 0 688 581 A1 12/1995

* cited by examiner

*Primary Examiner* — Melody Burch

(74) *Attorney, Agent, or Firm* — Oliff & Berridge, PLC

(57) ABSTRACT

A self-locking comprising a pulley in the form of a rotary cam, a brake shoe, and an actuating handle of a mechanism with an interruptible mechanical link between the pulley and handle after an intermediate position has been passed causing disengagement of the pulley and automatic return of the cam to a locking position. The mechanism comprises a selector with a pushbutton coupled with an operating means designed to occupy an active position or an inactive position to respectively disable or enable said disengagement of the pulley.

8 Claims, 8 Drawing Sheets

SELF-LOCKING DESCENDER WITH DISENGAGEABLE HANDLE

BACKGROUND OF THE INVENTION

The invention relates to a self-locking descender for descending along a rope, comprising:

- a pulley in the form of a cam rotating between a locking position of the rope against a brake shoe and a released position,
- an actuating handle of the pulley to perform manual release of the rope in an intermediate position,
- and a mechanism with an interruptible mechanical link between the pulley and handle after said intermediate position has been passed causing disengagement of the pulley and automatic return of the cam to the locking position.

STATE OF THE TECHNIQUE

The document EP 688581 filed by the applicant describes a descender of the kind mentioned in which the manual actuating handle is connected to the pulley by a mechanical link with a toggle-joint. Descending movement of the user is enabled when the handle moves to an intermediate position in which the cam is released. Double securing of the rope is possible in the loaded state for two distinct positions of the handle:

- either a raised position after the handle has been released,
- or after disengagement of the mechanical link when the handle is lowered beyond the intermediate position.

After disengagement, the mechanism has to be reset to re-establish the mechanical link. The disengagement threshold depends on the angular position of the handle and on the force to be supplied according to the load applied to the apparatus.

OBJECT OF THE INVENTION

The object of the invention consists in providing a self-locking descender with controlled disengagement of the mechanical link between the pulley and handle.

The descender according to the invention is characterized in that the mechanism comprises a selector coupled with an operating means designed to occupy an active position or an inactive position to respectively disable or enable disengagement of the pulley.

In the active position, the operating means of the selector comes up against a stop formed by a fixed boss to prevent any further movement of the handle beyond the intermediate position.

According to a preferred embodiment, the mechanical link of the mechanism comprises a toggle-joint enabling the operating means to come up against the boss before the dead point of the toggle-joint is passed. The latter is composed of a drive finger integral to the pulley and a transmission rod mounted swivelling inside a base integral to the handle. The operating means preferably comprise a circular ramp connected by a rod system to a pushbutton associated with the handle.

In the case of a monostable operating means subjected to the return action of a spring, releasing the selector results in automatic restoration of the disengagement function.

The operating means can also be bistable, switching from the active position to the inactive position and vice-versa taking place on each command pulse on the selector.

BRIEF DESCRIPTION OF THE DRAWINGS

Other advantages and features will become more clearly apparent from the following description of an embodiment of the invention, given for non-restrictive example purposes only and represented in the accompanying drawings, in which.

DETAILED DESCRIPTION OF THE INVENTION

Figure 1A:
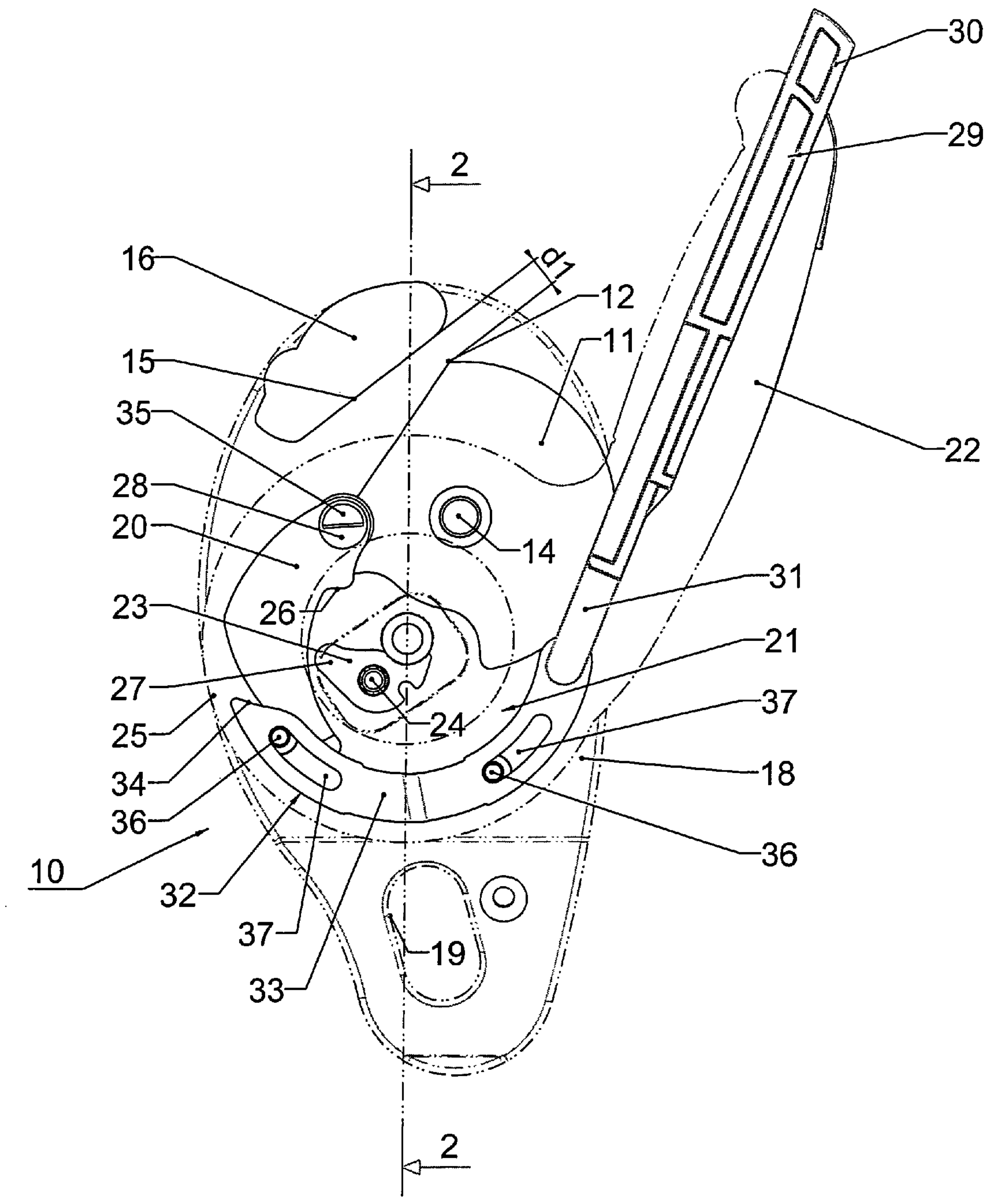
FIG. 1A is a schematic view of the descender equipped with the selector according to the invention, the handle being represented in the raised position and the selector in the inactive position.
Figure 1B:
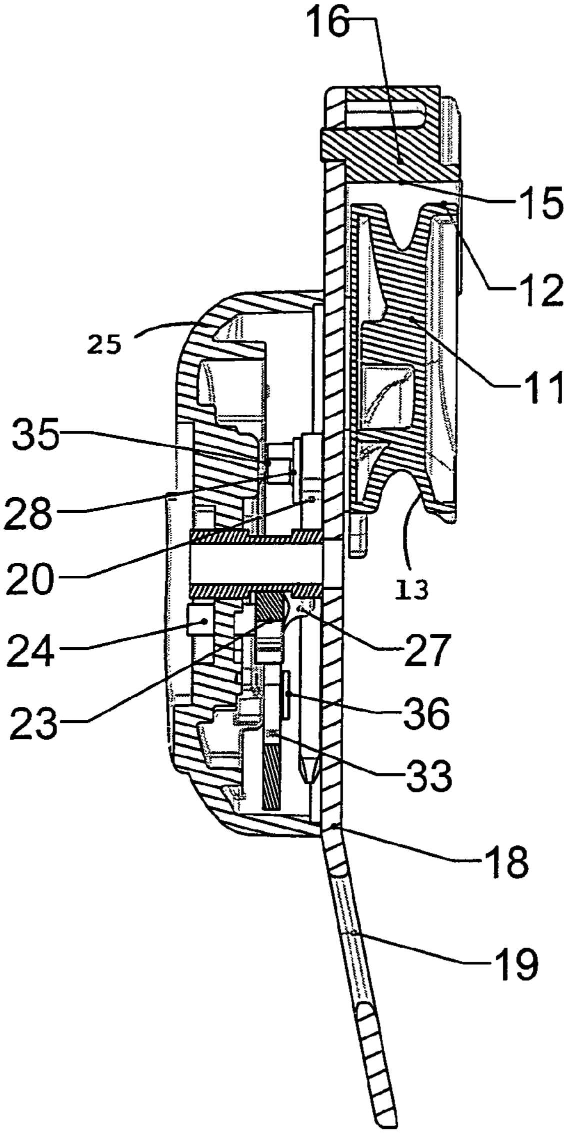
FIG. 1B shows a cross-section view along the line 2-2 of FIG. 1A.

With reference to the figures, a safety descender 10 comprises a pulley 11 in the form of a cam 12 and provided in addition with a groove 13 for winding the rope 17. Pulley 11 is mounted with limited rotation around a first swivel-pin 14 and operates in conjunction with a frictional surface 15 of a fixed shoe 16 to lock or release rope 17. Pin 14 and shoe 16 are supported by a first flange 18 which extends in a parallel direction with respect to a second mobile flange (not represented) of similar shape mounted swivelling to enable rope 17 to be fitted in place.

Each flange comprises an opening 19 at its base designed for hooking on a carabiner for attaching the descender to the user's harness. A return spring (not represented) of torsion type is wound on pin 14 and biases pulley 11 to the released position when the tension on rope 17 is lower than a predetermined threshold. The distance d1 between cam 12 and frictional surface 15 of the shoe is then maximum.

Pulley 11 is coupled to a drive finger 20 operating in conjunction with a mechanism 21 which is controlled by an actuating handle 22 to perform manual release of rope 17. Mechanism 21 is equipped with a transmission rod 23 mounted pivoting on a second swivel-pin 24 inside a circular base 25 in the form of a drum integral to handle 22.

Drive finger 20 is formed by a curved lever articulated on a third swivel-pin 28 securedly attached to mobile pulley 11 and passing through an oblong opening of first flange 18. Finger 20 is further equipped with a cheek 26, and the end of transmission rod 23 is provided with a stop 27 designed to come into engagement against cheek 26 to perform driving of pulley 11 in rotation when handle 22 is actuated.

Drive finger 20 and transmission rod 23 form a toggle-joint with dead point passage which corresponds to alignment of pins 28, 24 with the contact zone of stop 27 on cheek 26. The mechanical link between handle 22 and pulley 11 is established when stop 27 of transmission rod 23 is housed in cheek 26 of drive finger 20. The toggle-joint remains stable up to an intermediate position of handle 22. Cam 12 is moved away from shoe 16 and enables the user to perform his descent movement following release of rope 17.

Continued lowering of handle 22 beyond the intermediate position causes swivelling of the toggle-joint and breaking of the mechanical link between drive finger 20 and transmission rod 23. This results in a disengagement effect of pulley 11 from descender 10 and automatic return of cam 12 to a released position due to the tension action of rope 17. To reset mechanism 21, the operating direction of handle 22 simply has to be reversed from the disengaged position to the intermediate position or the raised position so as to re-establish the mechanical link between drive finger 20 and transmission rod 23.

The anti-panic function of such a self-locking descender is known and described in detail in the document EP 688581 filed by the applicant. In the state of load of descender 10, the presence of the interruptible mechanical link between handle 22 and pulley 11 enables locking of rope 17 to be preserved after disengagement of pulley 11, without maintaining a force on handle 22. The user who releases or grips handle 22 (in a panic situation) is in total safety due to the mechanism with double locking of the rope, respectively in the raised position and in the lowered and disengaged position of handle 22.

According to the invention, the mechanism 21 of descender 10 further comprises a control selector 29 designed to enable or disable disengagement of the mechanical link between drive finger 20 and transmission rod 23. Selector 29 comprises a pushbutton 30 situated on the end of handle 22 and connected by a rod system 31 to a mobile operating means 32 keeping the disengagement function in the inactive position, or disabling said function in the active position.

Operating means 32 can be bistable, or monostable if it operates in conjunction with a return spring. It is for example formed by a ramp 33 of circular shape housed in base 25 and having an inclined face 34 opposite rod system 31. Third swivel-pin 28 of drive finger 20 bears a boss 35 acting as end-of-travel stop for ramp 33.

Guide pins 36 are integral to base 25 and are housed in oblong apertures 37 of sector 33 to guide the latter with a circular movement when pushbutton 30 is depressed.

Operation of control mechanism 21 of descender 10 is as follows:

Selector 29 in Inactive State (FIGS. 2A-2D)

Pushbutton 30 of selector 29 is not active and remains salient so as to enable the anti-panic function.

Figure 2A:
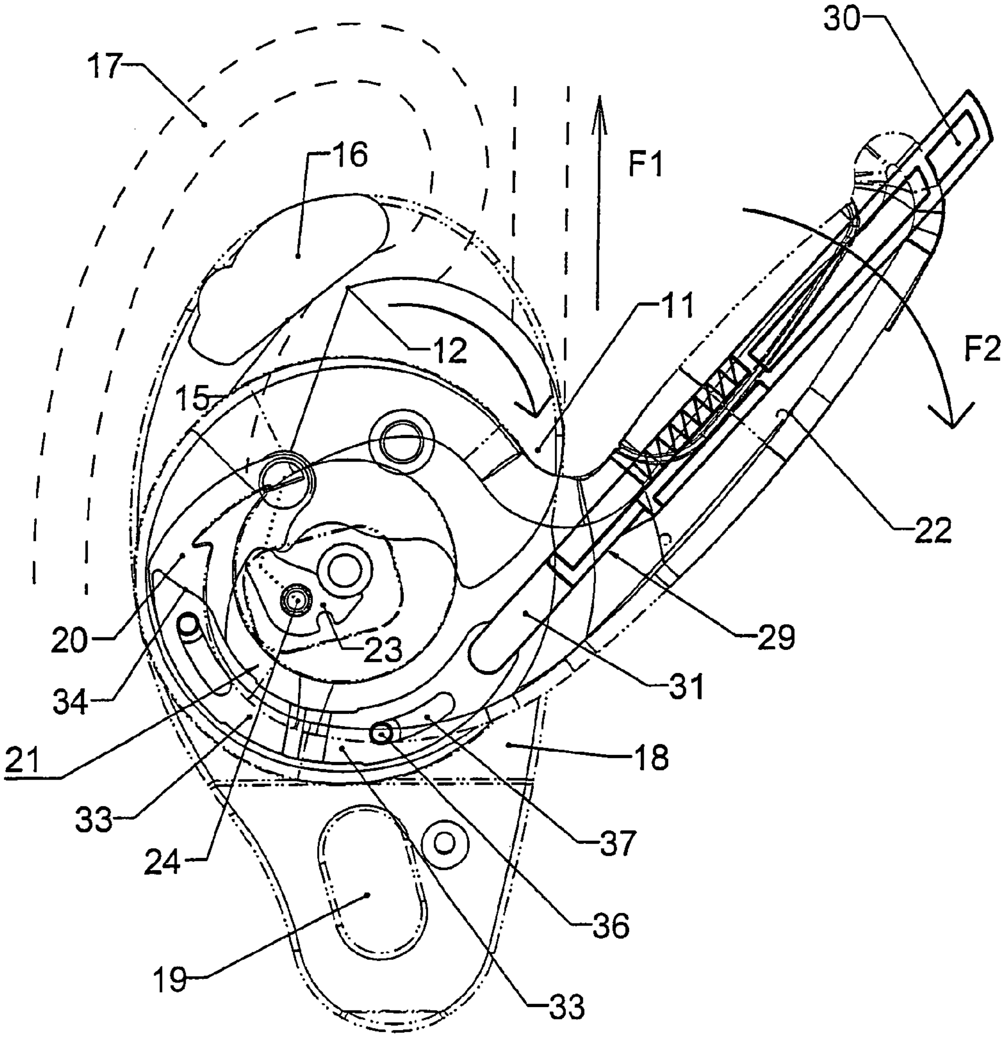
FIGS. 2A-2D illustrate different phases of operation of the descender when the selector is in the inactive position enabling disengagement.

In FIG. 2A, handle 22 is in the raised position and cam 12 locks rope 17 against shoe 16 following the tension F1 exerted on the top strand of the rope. Rotation of handle 22 in the direction of arrow F2 triggers the descent movement of the user following release of cam 12 enabled by the mechanical link of the toggle-joint formed by drive finger 20 and transmission rod 23.

Figure 2B:
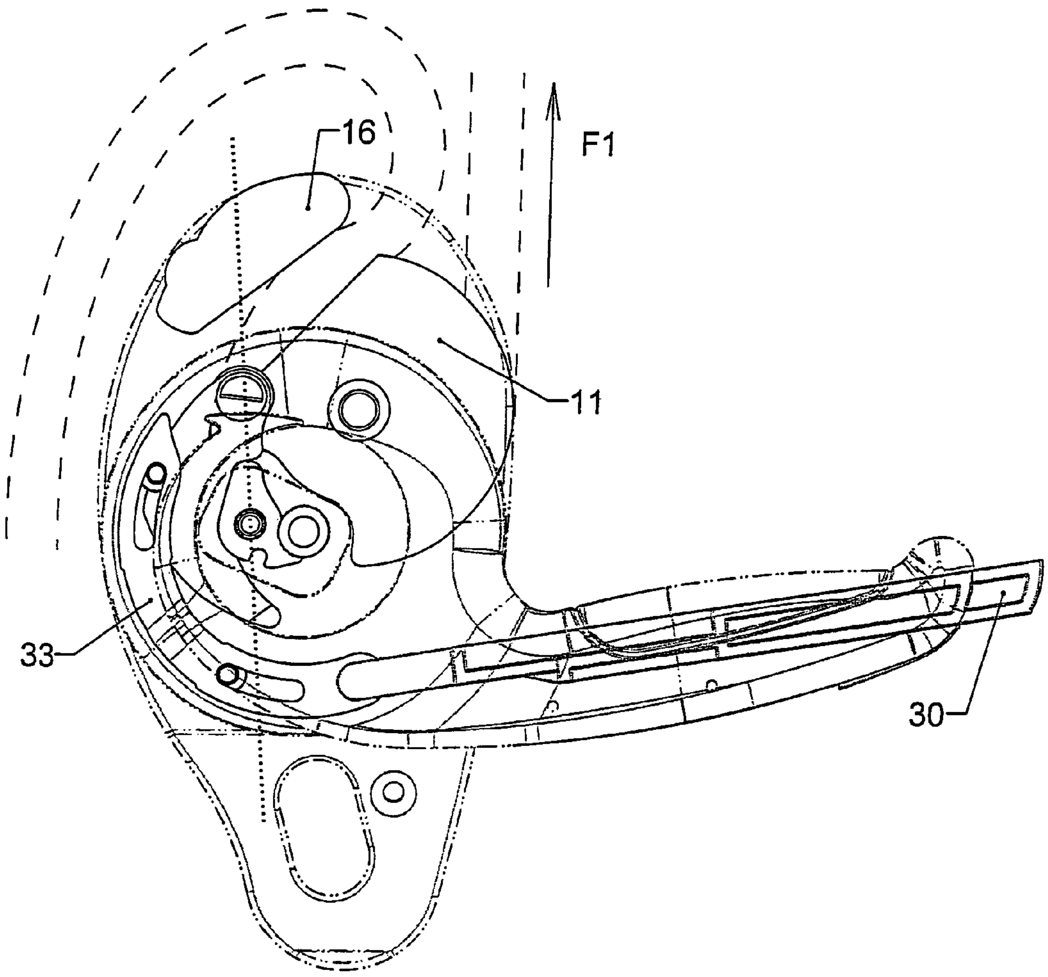

In FIG. 2B, handle 22 is moved to the intermediate position corresponding to maximum opening of cam 12. The toggle-joint becomes unstable following alignment (see broken lines) of swivel-pins 28 and 24 with the contact zone of stop 27 with cheek 26.

Figure 2C:
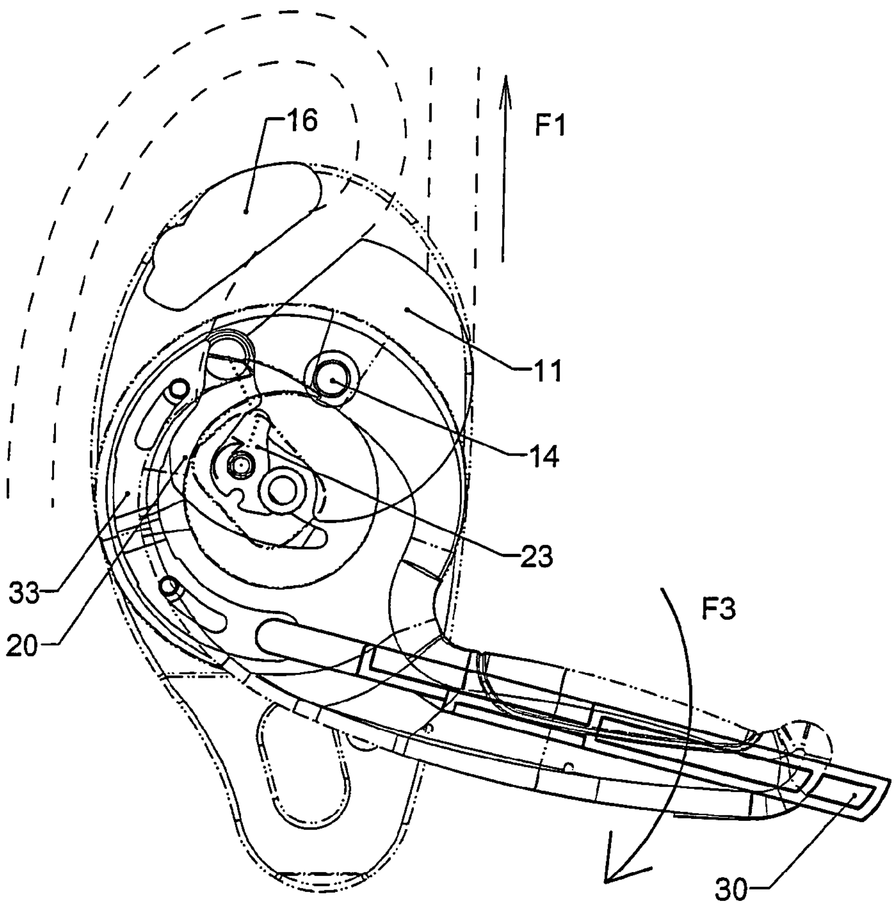

FIG. 2C shows swivelling of the toggle-joint when continued movement of handle 22 (arrow F3) takes place beyond the intermediate position. Ramp 33 operates in conjunction with drive finger 20 to make transmission rod 23 swivel on its pin 24.

Figure 2D:
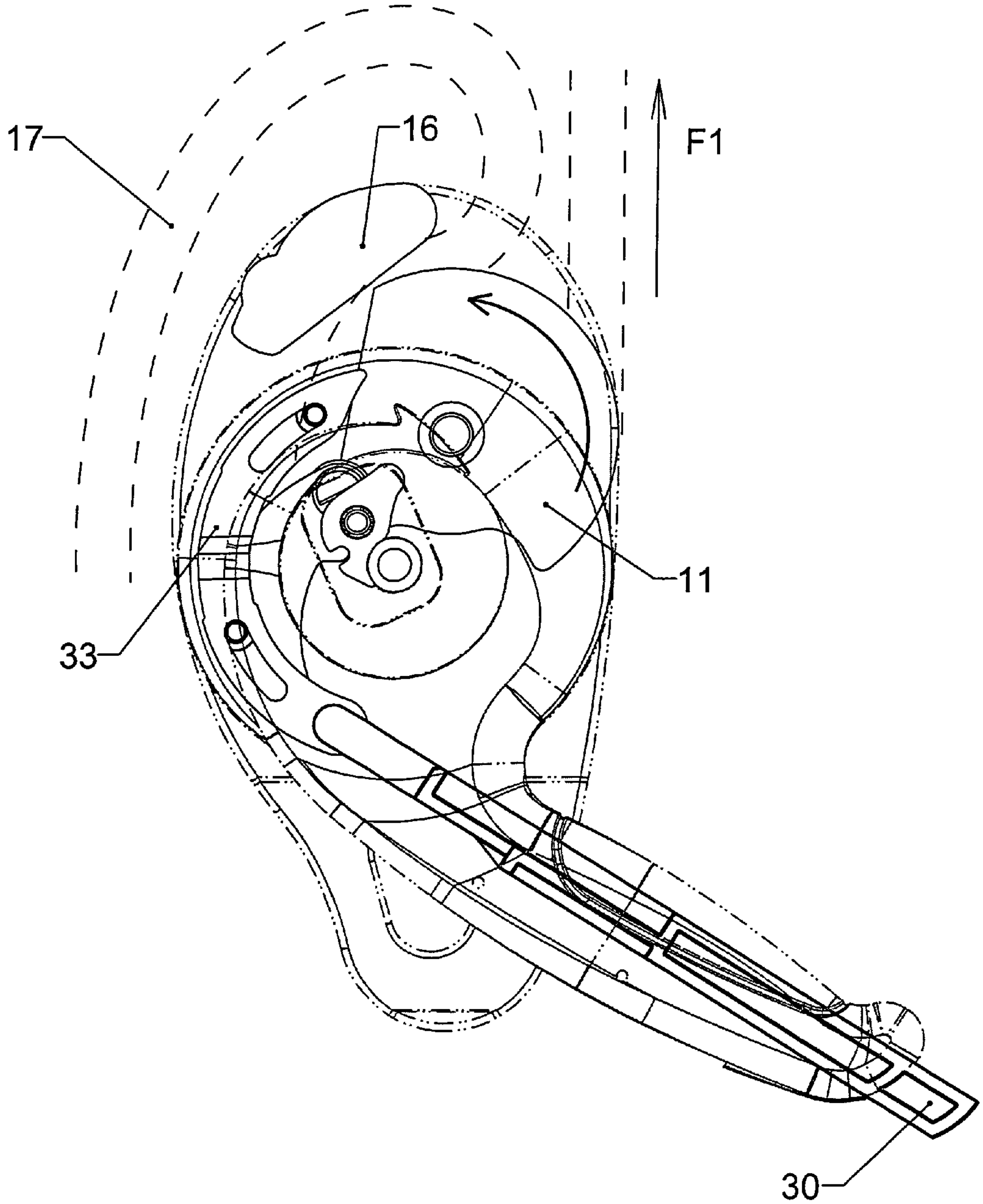

FIG. 2D illustrates the disengagement phase, the mechanical link of the toggle-joint being broken following the release of transmission rod 23. Handle 22 is no longer connected to that of pulley 11, making cam 12 return to the locking position.

Figure 3A:
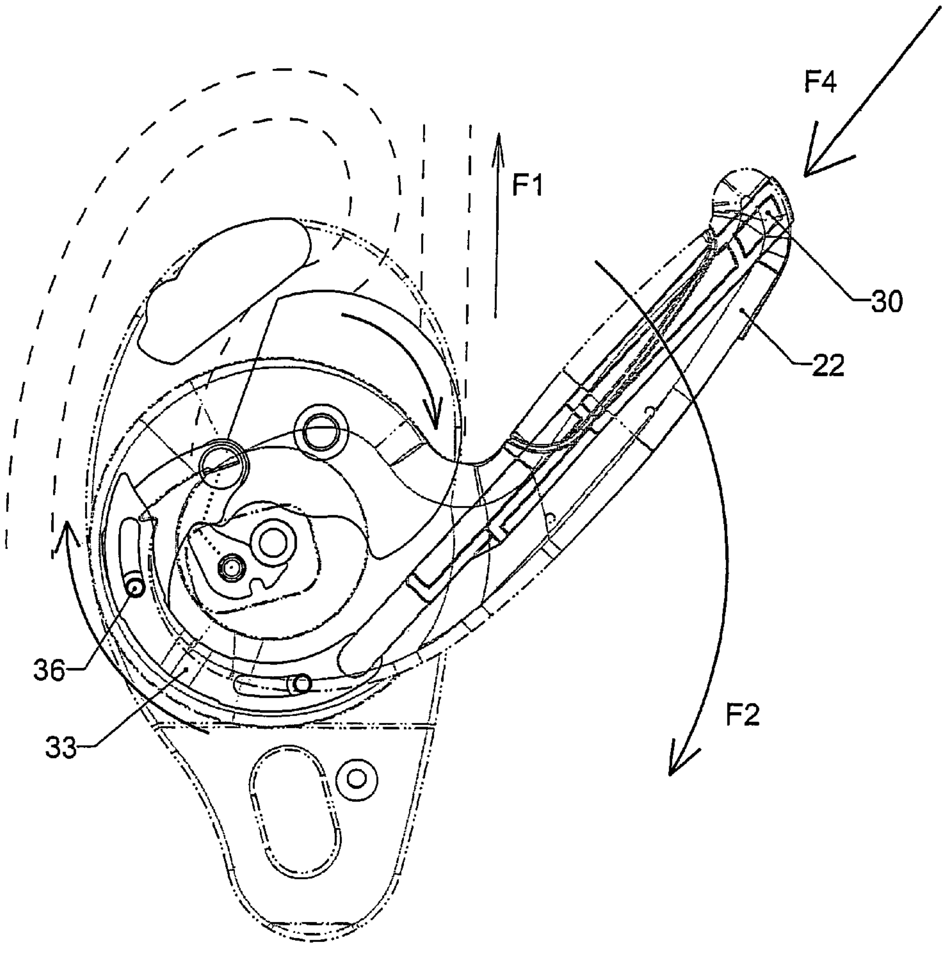
FIGS. 3A and 3B show operation of the descender when the selector is in the active position neutralizing disengagement by stopping movement of the handle beyond the intermediate position, and before the dead point of the toggle-joint is passed.
Figure 3B:
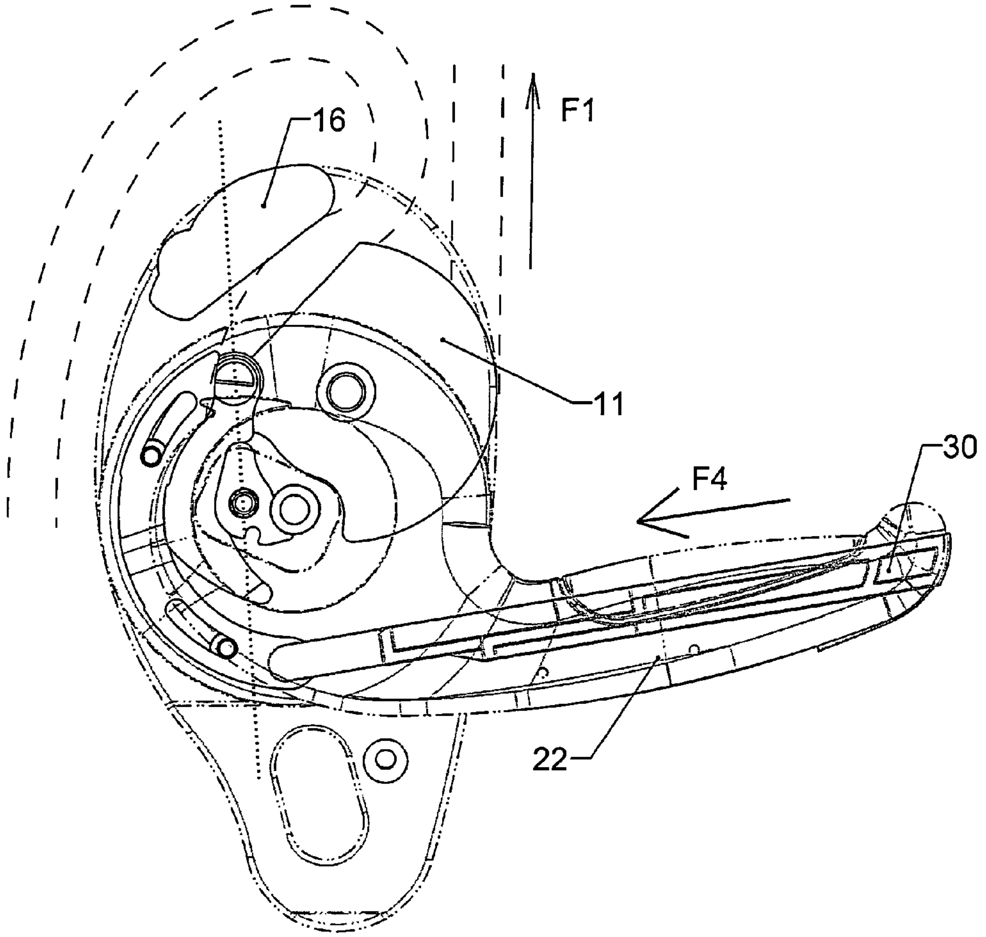

Selector 29 in Active State (FIGS. 3A-3B)

Pushbutton 30 of selector 29 is kept depressed to disable the anti-panic function.

In FIG. 3A, handle 22 is in the raised position and the pressure exerted on pushbutton 30 enables ramp 33 to advance in rotation along the periphery of base 25. Cam 12 remains in the locking position as in FIG. 2A. Progressive lowering of handle 22 (arrow F2) to the intermediate position (FIG. 3B) causes rope 17 to be released by separation movement of cam 12, and inclined face 34 of ramp 33 coming up against the stop formed by boss 35 of finger 20 before the toggle-joint dead point is passed.

Any forced rotation movement of handle 22 is then impossible and disables disengagement of the mechanical link so long as pushbutton 30 of selector 29 is kept depressed. Cam 12 remains in the released position and enables descent movement of the user.

Releasing pushbutton 30 moves ramp 33 away from boss 35 and enables automatic restoration of the anti-panic disengagement function.

Any forced movement of handle 22 beyond the intermediate position results in a reaction of inclined face 34 of ramp 33 on boss 35 which tends to move ramp 33 back in the opposite direction. This reverse rotation movement of ramp 33 results in translation of pushbutton 30, and creates a force tending to oppose that of the user's pushing to keep pushbutton 30 depressed.

The invention claimed is:

1. A self-locking descender for descending along a rope, comprising:

a pulley in the form of a cam rotating between a locking position of the rope against a brake shoe and a released position;

an actuating handle of the pulley to perform manual release of the rope in an intermediate position; and a mechanism with an interruptible mechanical link between the pulley and the actuating handle after said intermediate position has been passed causing disengagement of the pulley and automatic return of the cam to the locking position, wherein the mechanism further comprises a selector coupled with an operating means designed to occupy an active position to disable disengagement of the pulley and designed to occupy an inactive position to enable said disengagement of the pulley.

2. The self-locking descender according to claim 1, wherein in the active position the operating means of the selector comes up against a stop formed by a fixed boss to prevent any further movement of the actuating handle beyond the intermediate position.

3. The self-locking descender according to claim 2, wherein the interruptible mechanical link of the mechanism comprises a toggle-joint enabling the operating means to come up against the fixed boss before a dead point of said toggle-joint is passed.

4. The self-locking descender according to claim 3, wherein the toggle-joint of the mechanism is composed of a drive finger integral to the pulley and a transmission rod mounted swivelling inside a base integral to the actuating handle.

5. The self-locking descender according to claim 1, wherein the operating means are monostable to disable said disengagement when the selector is held in the active position, and releasing the selector results in automatic restoration of the disengagement function.

6. The self-locking descender according to claim 1, wherein the operating means are bistable at each command pulse on the selector.

7. The self-locking descender according to claim 1, wherein the operating means comprise a circular ramp connected by a rod system to a pushbutton associated with the actuating handle.

8. The self-locking descender according to claim 7, wherein the pushbutton is integrated in the end of the actuating handle.

* * * * *